United States Patent [19]

Ahvenainen et al.

[11] Patent Number: 5,179,180

[45] Date of Patent: Jan. 12, 1993

[54] PROCESS FOR THE GAS-PHASE HOMO- OR COPOLYMERIZATION OF ALPHA-OLEFIN WITH A PRETREATED CATALYST SYSTEM

[75] Inventors: Antero Ahvenainen, Kulloo; Hannu Salminen, Porvoo; Jari Tervonen, Porvoo; Tarja Söderberg, Porvoo, all of Finland

[73] Assignee: Berggren OY AB, Helinski, Finland

[21] Appl. No.: 429,025

[22] Filed: Oct. 30, 1989

[30] Foreign Application Priority Data

Nov. 8, 1988 [FI]  Finland .................................. 88543

[51] Int. Cl.$^5$ ............................................... C08F 2/34
[52] U.S. Cl. ................................. 526/125; 526/127; 526/128; 526/136; 526/348.6; 526/901; 526/904; 526/907
[58] Field of Search ............... 526/901, 907, 125, 128, 526/127, 136

[56] References Cited

U.S. PATENT DOCUMENTS

| | | | |
|---|---|---|---|
| 3,784,539 | 1/1974 | Ort .................................. | 526/907 X |
| 3,984,351 | 10/1976 | Rekers et al. ................... | 252/430 |
| 4,343,926 | 8/1982 | Caumartin et al. ............... | 526/68 |
| 4,360,560 | 11/1982 | Desvignes et al. ............... | 526/60 |
| 4,511,703 | 4/1985 | Bailly .............................. | 526/125 |
| 4,520,163 | 5/1985 | Goodall .......................... | 525/53 |
| 4,525,547 | 6/1985 | Kato et al. ...................... | 526/68 |
| 4,543,389 | 9/1985 | Burstain et al. ................. | 525/53 |
| 4,673,662 | 6/1987 | Bailly .............................. | 502/115 |
| 4,684,703 | 8/1987 | Wagner et al. .................. | 526/901 X |

FOREIGN PATENT DOCUMENTS

| | | |
|---|---|---|
| 0285443 | 10/1988 | European Pat. Off. . |
| 844614 | 5/1985 | Finland . |
| 855153 | 12/1985 | Finland . |
| 75846 | 4/1988 | Finland . |
| 75847 | 4/1988 | Finland . |
| 75849 | 4/1988 | Finland . |
| 2070035 | 9/1981 | United Kingdom . |

Primary Examiner—Fred Teskin

[57] ABSTRACT

The polymerization of certain alpha-olefins in a gas phase involves the problem of agglomeration of the product into particles disadvantageous from the viewpoint of its handling. In the present invention this problem has been solved by means of a new type of process for the homo- or copolymerization of alpha-olefins. In the process the catalyst system is pretreated by contacting and reacting a transition-metal compound which is solid or on a solid carrier with an organoaluminum compound, and possibly an electron donor, in a liquid medium, and by drying the thus formed reaction product to produce a solid catalyst system. The thus pretreated solid and active catalyst system is then fed together with an alpha-olefin in the gaseous state into a gas-phase reactor, and polymerization is carried out by contacting them with each other. By feeding a dry and active catalyst system into the gas-phase reactor, it is possible to avoid the agglomeration of the product which occurs in conventional processes in which an organoaluminum compound and possibly an electron donor are fed in a liquid medium into the reactor.

11 Claims, No Drawings

PROCESS FOR THE GAS-PHASE HOMO- OR COPOLYMERIZATION OF ALPHA-OLEFIN WITH A PRETREATED CATALYST SYSTEM

The invention relates to a process for the homo- or copolymerization of alpha-olefin by pretreating the catalyst-system components, which comprise a transition-metal compound which is solid or on a solid carrier, an organoaluminum compound in a liquid medium, and possibly an electron donor, by feeding the pretreated catalyst system and a gaseous-state alpha-olefin with its possible comonomers into a gas-phase reactor, are by contacting them with each other in order to produce a homo- or copolymer of the alpha-olefin. The invention also relates to a catalyst system intended for the above process and comprising a transition-metal compound, an organoaluminum compound and possibly an electron donor.

It is known in the art to polymerize or copolymerize alpha-olefins by using coordination catalysts, of which the most usable are the so-called Ziegler-Natta catalysts. Ziegler-Natta catalysts are made up of a transition-metal compound, which is preferably deposited on a carrier and the metal of which belongs to groups IV-VI of the Periodic Table, an organometallic compound the metal of which belongs to groups I-III of the Periodic Table, and often an electron donor compound which both activates the catalyst and enhances its stereospecificity.

An especially effective and selective Ziegler-Natta catalyst is a catalyst system which is formed by combining a solid catalyst comprising a titanium compound and a magnesium compound carrier with an organoaluminum cocatalyst which activates it.

Usable technology in the art is represented by the polymerization of alpha-olefins, carried out in a gas phase. It is carried out by feeding the gaseous reaction components needed in the polymerization into a gas-phase reactor in which non-gaseous catalyzing components are fluidized by means of a gas flow. Thereupon the monomer in the gaseous state adheres to the active centers produced by the catalyst system and is polymerized, forming a polymer powder or polymer granulate which is suitable with respect to both its working and handling properties. The normal procedure is that a solid catalyst comprising a magnesium carrier and a transition-metal compound, and a donor and an organometallic compound acting as a cocatalyst, are fed separately into a polymerization reactor, in which they are complexed. The solid catalyst is in this case fed into the reactor dry in an inert gas flow, whereas the cocatalyst and the possible donor are fed into the reactor separately in a liquid medium. However, a method such as this has the disadvantage that in the reactor the liquid medium with the cocatalyst and donor causes the polymer product to agglomerate, forming too large particles of the powder.

Attempts have been made to solve the problems due to the separate feeding in of the cocatalyst and donor in a liquid phase, for example, by combining the various components of the catalyst system in advance by means of prepolymerization. U.S. Pat. No. 4,543,389 discloses the preparation of a shockproof ethylene propylene copolymer by first carrying out a prepolymerization with propylene and a conventional Ziegler-Natta catalyst, whereafter a second prepolymerization is carried out in which a solid catalyst, a cocatalyst and a donor are combined by polymerizing $C_5$–$C_9$-alpha-olefin. Thereafter the last-mentioned $C_5$–$C_9$-prepoly-olefin mixture, which is in the liquid state, is injected simultaneously with the first-mentioned propylene prepolymer into a polymerization reactor, which contains ethylene and propylene monomer in a gas phase. Thereupon the said solution coats the particles of the polypropylene powder, and thereafter the desired ethylene propylene copolymer grows from the active centers which are on the surface of the coated homopolypropylene particles. Although this state-of-the-art publication states that the small solid catalyst particles prevent "gel" formation, the publication has not, however, taken into account the deleterious agglomerating effect which is produced when a prepolymerized solid catalyst is fed in the form of a liquid mixture or a solution into the reactor.

U.S. Pat. Nos. 4,511,703 and 4,673,662 disclose similar processes for bringing a solid catalyst, a cocatalyst and an electron donor together and for stabilizing them before a polymerization which is carried out in a gas phase. The patents suggest, for example, that the catalyst complex is formed by mixing together the solid catalyst and the cocatalyst, whereafter the obtained "catalyst complex" is coated by means of prepolymerization. Such a procedure is presented, for example, in example 20 of the publications. Examples 21 and 22 show, however, that the catalyst system coated with a prepolymer does not alone suffice for the polymerization or copolymerization of alpha-olefins; it is also necessary to feed into the fluid-bed reactor a tri-n-octyl aluminum cocatalyst and a methyl paratoluate electron donor in an n-hexane solution. Since it is exactly this step that causes agglomeration, the said publications have not in a satisfactory manner solved the problems associated with the agglomeration of the product.

U.S. Pat. No. 4,520,163 also discloses the preparation of a prepolymer, but ultimately, however, there is added into the gas phase reactor zone a triethyl aluminum cocatalyst which is precisely the cause of agglomeration of the produced polymer product.

The object of the present invention is to provide a process and a catalyst system for the homo- or copolymerization of alpha-olefins, avoiding the adherence and agglomeration due to liquid components. The invention is characterized in what is stated in the characterizing clauses of the independent claims. The invention is thus based on avoiding the agglomeration of the polymerization product by complexing the cocatalyst, and possibly a donor, with a solid catalyst and by drying the complex to produce a solid catalyst system before it is fed into the reactor. It has thus been realized that the prepolymerization coatings of the catalyst system are not necessary for keeping the components together and for maintaining their activity. The process according to the present invention may, however, be combined with prepolymerization when this is necessary, for example, in order to produce a polymer powder of a suitable type.

The process according to the invention for the homo- or copolymerization of alpha-olefins begins with a stage in which the components of the catalyst system are pretreated. The components comprise a compound of a transition metal which belongs to groups IV-VI of the Periodic Table, the compound being solid or on a solid carrier, an organometallic compound, especially an organoaluminum compound, in a liquid medium, and possibly an electron donor. In the pretreatment, the transition-metal compound, the organometallic compound and the electron donor are first contacted and reacted with each other, and then the reaction product is dried to produce a solid and active catalyst system. It is assumed that the reaction taking place in the pretreatment leads to a complex formed by the transition-metal compound, the organometallic compound and the electron donor; when dried, the complex forms the said solid, relatively stable and catalytically active catalyst system.

The pretreated catalyst system is then fed together with gaseous-state alpha-olefin and possible comonomers into a gas-phase reactor, in which the catalyst system and the monomer(s) are contacted with each other and the alpha-olefin with its possible comonomers polymerizes without the polymer particles becoming agglomerated.

The solid catalyst component used in the process or catalyst system according to the invention is a transition-metal compound which is either solid or on a solid carrier. The transition metal belongs to groups IV-VI of the Periodic Table and is preferably titanium. If a solid transition-metal compound is used, titanium trichloride is preferable, and if a liquid transition-metal compound on a carrier is used, titanium tetrachloride is preferable. When necessary, it is also possible to use other catalytically active transition-metal compounds, either alone or together with each other or with the above-mentioned titanium chlorides.

The solid carrier compound used may be any known catalyst carrier compound known in the art, such as a magnesium oxide, a magnesium oxyhalide or a magnesium halide, of which the last-mentioned, specifically $MgCl_2$, has recently become the most important carrier compound for isospecific catalysts. The carrier is preferably treated, for example ground, modified or synthesized, in such a manner that the solid catalyst formed from it has a morphology suitable in terms of activity and stereospecificity.

The carrier is activated with a transition-metal compound in a manner known per se by depositing a transition-metal compound, and possibly a donor, once or several times on the carrier surface. Thereby a solid catalyst is formed which is capable of reacting with the cocatalyst and of forming an active and stereospecific catalyst system.

The cocatalyst may be any cocatalyst known in the art, for example an organometallic compound of the type of an organoaluminum compound. An alkyl aluminum halide or trialkyl aluminum is an especially advantageous cocatalyst. The only criterion in this, also, is that the cocatalyst must be capable of forming an active and preferably stereospecific reaction product with the solid catalyst.

The catalyst system may, in addition to the solid catalyst component and the cocatalyst component, also contain an electron donor component. It is selected from among electron donors mentioned in the state of the art and is capable of reacting with the other components mentioned above to form a solid and active product. The electron donor component may be, for example, a silane compound and, preferably, is diphenyl dimethoxy silane. The electron donor may be either a so-called internal electron donor, in which case it is added to the carrier at the outset, or an external electron donor, in which case it is added in the said manner together with the cocatalyst.

The process and catalyst system according to the invention is suitable especially for the gas-phase polymerization and copolymerization of those alpha-olefins in which there occurs agglomeration of the forming polymer product. Such polymerizations include the processes for the preparation of ethylene propylene copolymers mentioned in the state of the art and other processes for the homo- or copolymerization of alpha-olefins. The process and the catalyst system are especially well suited for the polymerization of monomers which contain more than three carbon atoms, because in that case the product is a stereospecific polymer having a high isotactic index. According to one embodiment, a transition-metal compound which is solid or on a solid carrier and is preferably titanium tetrachloride, is mixed together with a hydrocarbon solution of an organoaluminum compound and possibly of an electron donor such as diphenyl dimethoxysilane, whereupon the said components are complexed. It is advantageous to use a hydrocarbon solution in which the molar ratio of the organoaluminum compound to the electron donor is within the range 0.5:1–40:1, preferably approximately 15:1. The amount of the solution is preferably such that the molar ratio of the organoaluminum compound to titanium is approximately 10–500, preferably approximately 200. The mixing temperature is by no means critical; it may be, for example, room temperature.

After the mixing, the mixture is transferred into a tank, from which the hydrocarbon solution is evaporated for example by heating and/or evacuating to the boiling point, whereby a dry catalyst complex is formed. The complex is surprisingly active and stereospecific.

The dry, active catalyst component is as such usable as a polymerization catalyst, or it may be coated by prepolymerizing a monomer, such as $C_3$-$C_{10}$-alpha-olefin, on its surface, for example by a prepolymerization process known per se. The polymerization is preferably carried out by feeding the dried active catalyst complex as such in an inert gas flow into the polymerization reactor. By directing into the dry, preferably fluidized catalyst complex in the reactor a gaseous monomer at a predetermined pressure and temperature and for a predetermined period, the monomer can be polymerized without the forming product agglomerating into particles larger than desired.

The catalyst system according to the invention stores relatively well when stored in nitrogen gas, although its stereospecificity will somewhat deteriorate. It can, however, be said that the catalyst system according to the invention does not involve the disadvantage that it should be prepared directly in connection with the polymerization.

A few embodiment examples are presented below, the purpose being to illustrate the process and catalyst system according to the invention.

EXAMPLE 1

Approximately 50 mg of a solid titanium tetrachloride catalyst on a magnesium chloride carrier was mixed with a pentane solution of tri-isobutyl aluminum and diphenyl dimethoxysilane, the molar ratio of the aluminum compound to the silane compound in the solution being approximately 20:1. The amount of the solution was such that the molar ratio of the aluminum compound to titanium was approximately 200. The mixture was fed into an autoclave, where the pentane was evaporated out, and a dry and active catalyst compound was obtained. The dried complex was then contacted with 1-butene vapor at a temperature of 55° C. and a pressure of 5 bar for 4 hours, the hydrogen pressure in the gas-phase reactor being 0.2 bar. The obtained polymer was dried, weighed and analyzed. The results of the analysis are given in Table 1.

EXAMPLE 2

Example 2 was carried out in the same manner as Example 1, but the dried complex was allowed to mature in a nitrogen atmosphere for 2 hours before the monomer was fed into the reactor.

EXAMPLES 3 AND 4

Examples 3 and 4 were carried out in the same manner as Example 1, but the dried complex was allowed to mature in a nitrogen atmosphere for 4 hours before the monomer was fed into the reactor.

EXAMPLE 5

This example was carried out in the same manner as Example 1, but the dried complex was allowed to mature in a nitrogen atmosphere for 8 hours before the monomer was fed into the reactor.

EXAMPLE 6

Example 6 was carried out in the same manner as Example 1, but the dried complex was allowed to mature in a nitrogen atmosphere for 16 hours before the monomer was fed into the reactor.

EXAMPLE 7

This example was carried out in the same manner as Example 1, but the dried complex was allowed to mature in a nitrogen atmosphere for 67 hours before the monomer was fed into the reactor.

EXAMPLES 8 AND 9

These examples were carried out in the same manner as Example 1, but the catalyst was coated by prepolymerizing the propylene in such a manner that the catalyst contained approximately 2.4 g of polypropylene/g of the solid component.

EXAMPLE 10

Example 10 was carried out in the same manner as Example 8, but the dried complex was allowed to mature in a nitrogen atmosphere for 2 hours before the monomer was fed into the reactor.

EXAMPLE 11

This example was carried out in the same manner as Example 8, but the dried complex was allowed to mature in a nitrogen atmosphere for 4 hours before the monomer was fed into the reactor.

EXAMPLE 12

This example was carried out in the same manner as Example 8, but the dried complex was allowed to mature in a nitrogen atmosphere for 12 hours before the monomer was added.

EXAMPLE 13

This example was carried out in the same manner as Example 8, but the dried complex was allowed to mature in a nitrogen atmosphere for 22 hours before the monomer was added.

Table 1 shows the catalyst activities of the products of the examples, expressed as produced polypropylene bulk/g of catalyst calculated as titanium, the melt index and the isotactic index.

TABLE 1

| Example | Maturation time, h | Productivity kg PB/g Ti | Melt index g/min | Isotactic index, % |
|---|---|---|---|---|
| 1 | 0 | 182 | 38 | 94.0 |
| 2 | 2 | 186 | 46 | 89.5 |
| 3 | 4 | 46 | 34 | — |
| 4 | 4 | 70 | 29 | 98.0 |
| 5 | 8 | 125 | 39 | 93.2 |
| 6 | 16 | 123 | 44 | 97.5 |
| 7 | 67 | 151 | 57 | 91.7 |
| 8 | 0 | 93 | 30 | 94.5 |
| 9 | 0 | 100 | 31 | 95.1 |
| 10 | 2 | 52 | 17 | 97.9 |
| 11 | 4 | 81 | 23 | 96.3 |
| 12 | 12 | 80 | 33 | 94.8 |
| 13 | 22 | 124 | 7 | 97.7 |

We claim:
1. A process for the homo- or copolymerization of alpha-olefins by means of a catalyst system, wherein
   (a) the catalyst components, comprising a titanium compound which is solid or on a solid carrier, an organoaluminium compound, and an electron donor are treated in a liquid medium,
   (b) the treated catalyst system and gaseous-state alpha-olefin are fed into a gas-phase reactor, and
   (c) are contacted with each other in order to produce a homo- or copolymer of alpha-olefin, characterized in that the treatment stage a) comprises the steps wherein
      (i) the titanium metal compound, which is solid or on a solid carrier, is contacted with a mixture of the organoaluminum compound and the electron donor, which is an external donor and reacted with the titanium and organoaluminum compounds, and is
      (ii) the thus formed reaction product is separated from the liquid medium to produce a dry and solid catalyst system before it is fed into the gas-phase reactor, and that in stage b) and c), the alpha-olefin used has more than two carbon atoms.

2. A process according to claim 1, characterized in that the titanium metal compound is titanium tetrachloride which has been deposited on the solid carrier, which is magnesium chloride.

3. A process according to claims 1 or 2, characterized in that the organoaluminum compound is trialkyl aluminum.

4. A process according to claims 1 or 2, characterized in that the electron donor is a silane compound.

5. A process according to claims 1 or 2, characterized in that the molar rate of the organoaluminium compound to the transition metal ratio of the organoaluminium compound to the transition metal compound calculated as metal is within the range of 10–500.

6. A process according to claims 1 or 2, characterized in that the molar ratio of the organoaluminium compound to, the electron donor is approximately 0.5:40:1.

7. A process according to claims 1 or 2 characterized in that stage ii) is carried out by evaporating the liquid media.

8. A process according to claims 1 or 2, characterized in that the alpha-olefin is 1-butene.

9. A process according to claim 5, characterized in that the silane compound is diphenyl dimethoxysilane.

10. A process according to claim 6, characterized in that the molar ratio of the organoaluminium compound to the titanium metal compound is approximately 200.

11. A process according to claim 7, characterized in that the molar ratio of the organoaluminium compound to the electron donor is approximately 15:1.

* * * * *

UNITED STATES PATENT AND TRADEMARK OFFICE
CERTIFICATE OF CORRECTION

PATENT NO. : 5,179,180
DATED : January 12, 1993
INVENTOR(S) : Ahvenainen et al.

It is certified that error appears in the above-indentified patent and that said Letters Patent is hereby corrected as shown below:

On the cover page, under Assignee, delete "Berggren Oy AB, Helinski, Finland" and insert -- Neste Oy, Kulloo, Finland".

Signed and Sealed this

Ninth Day of August, 1994

Attest:

BRUCE LEHMAN

Attesting Officer

Commissioner of Patents and Trademarks